2 Sheets—Sheet 1.

E. R. BROWN,

Assignor by mesne assignments to E. CHESTERMAN & S. McHENRY.

TICKET-RECORDER.

No. 7,299. Reissued Sept. 5, 1876.

Witnesses.

J. E. Cheney.

H. A. McHarris.

Inventor.

Edwin R. Brown.

per Edwin Chesterman

Attorney.

2 Sheets—Sheet 2.

E. R. BROWN,

Assignor by mesne assignments to E. CHESTERMAN & S. McHENRY.

TICKET-RECORDER.

No. 7,299. Reissued Sept. 5, 1876.

Witnesses.

J. E. Cheney

H. A. McHarris.

Inventor.

Edwin R. Brown per Edwin Chesterman

Attorney.

UNITED STATES PATENT OFFICE.

EDWIN R. BROWN, OF CHICAGO, ILLINOIS, ASSIGNOR, BY MESNE ASSIGNMENTS, TO EDWIN CHESTERMAN, OF PHILADELPHIA, PENNSYLVANIA, AND S. McHENRY, OF WOODBURY, NEW JERSEY.

IMPROVEMENT IN TICKET-RECORDERS.

Specification forming part of Letters Patent No. 34,939, dated April 15, 1862; reissue No. 7,299, dated September 5, 1876; application filed August 29, 1876.

DIVISION A.

*To all whom it may concern:*

Be it known that I, EDWIN R. BROWN, of Chicago, in the county of Cook and State of Illinois, have invented an Improved Ticket-Recorder for Railroads, Hotels, and other uses, of which the following is a specification:

Another division, "B," is filed simultaneously herewith.

Figure 2:
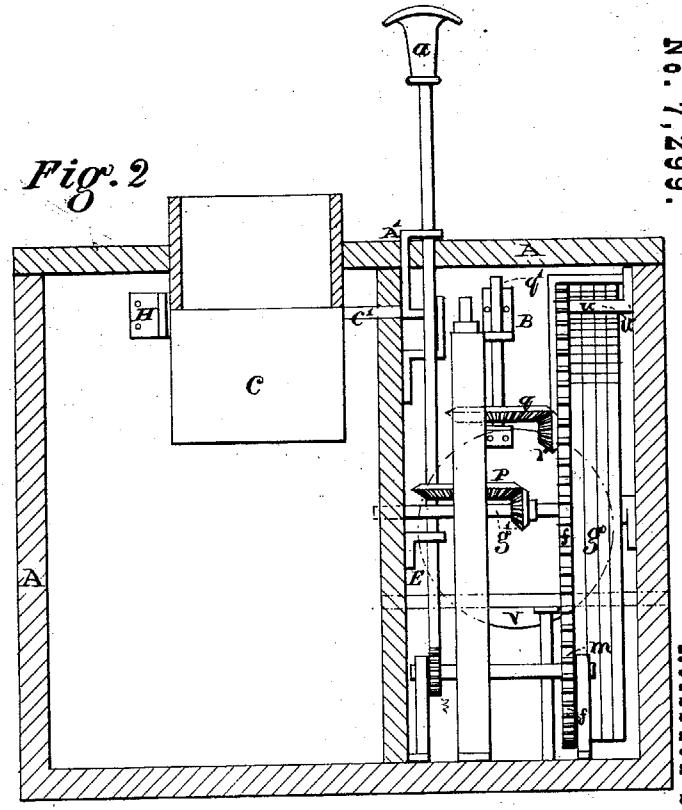
Figure 1:
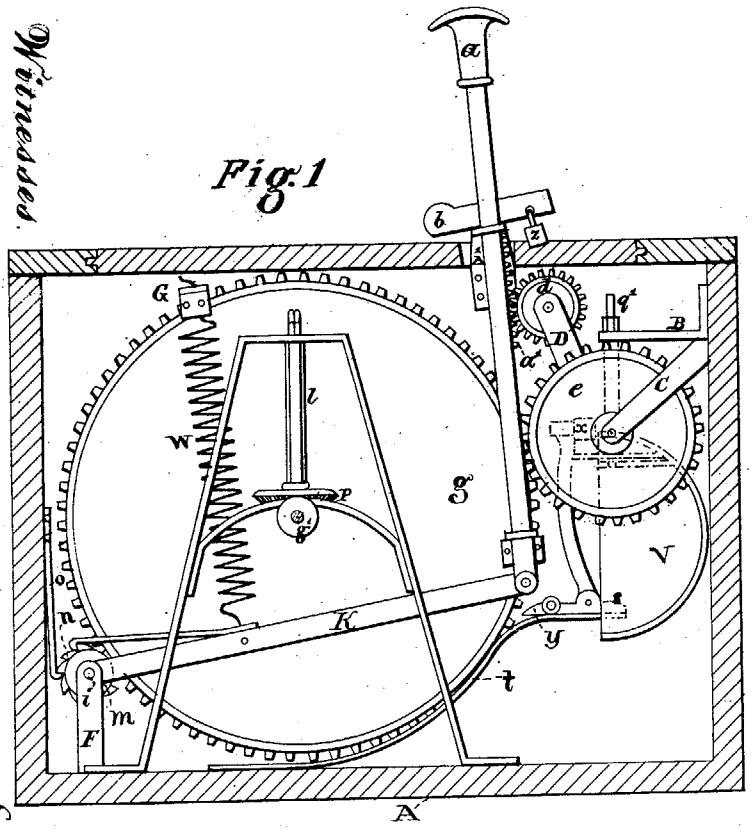
Figure 3:
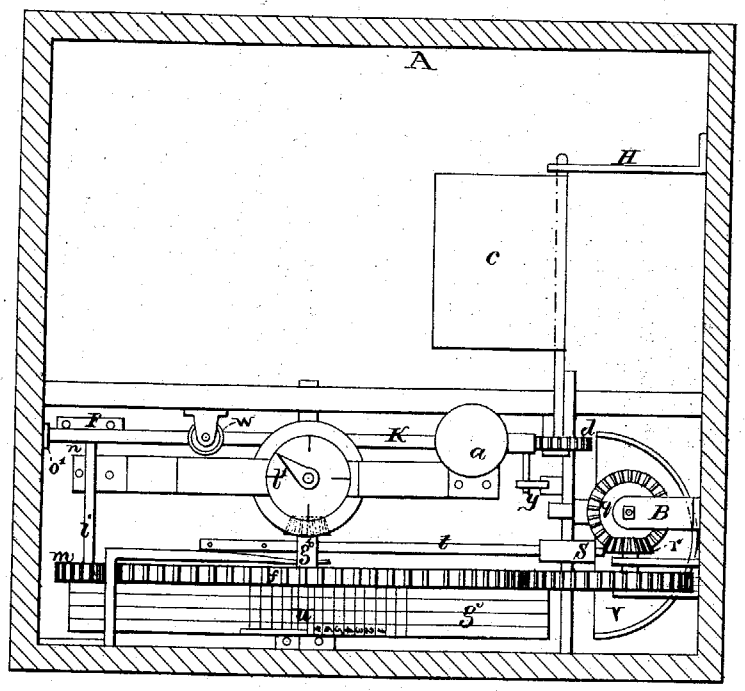

In the drawing, Figure 1 is a transverse section of a machine illustrating my invention. Fig. 2 is a longitudinal section of the same, in a slightly modified form. Fig. 3 is a plan of the same, with the cover or top removed.

Similar letters of reference indicate corresponding parts of the several figures.

The subject of my invention is a portable apparatus, by means of which an accurate record is kept of the number of travelers passing over a road, and fraud against the same thereby prevented.

The invention consists in the combination, in a portable apparatus carried and operated by the collector of fares, of a register, indicator or alarm, and receiver, whereby, at one and the same impact, a deposit is made in the receiver, a numerical registration made, and an alarm sounded; also, in the combination of the actuating and recording mechanism with a receiver having a depositing-orifice, opened only during the deposit, and closed at all other times; also, in the combination, with an actuating-arm pivoted on the axis of the ratchet of the recording mechanism, of a spring feeding-pawl taking into said ratchet, and a reaction-spring, restoring said arm to position; also, in the combination, with an actuating-arm, feeding-pawl, and ratchet, moved around fixed centers, of a retaining-pawl attached to the body of the machine, and all placed at the point most distant from the point of actuation; also, in combination, with the registering-train, of a key-shaft, whereby it may be set to any required position; also, in the combination, with a registering-train, and simultaneously actuated therewith, of an alarm, the indication of which immediately follows the act of complete registration.

Its construction and operation are as follows: A represents the outer case of the machine, which may be of any material preferred, and of such size as the particular use for which the machine is designed may render necessary. A′, B, C, D, E, F, G, and H are lugs by which the moving parts are secured. *a* is the actuating-rod, operating, by one and the same impact, the deposit in the receiver, the register, and the indicator or alarm. It reciprocates in the lugs A′ and E, and is provided with a rack, *a′*, which gears with a pinion, *d*, on a shaft, *c′*, journaled in the lugs D and H. An apron, *c*, is attached to the shaft *c′*, and opens and closes the depositing-orifice of the receiver.

A bar, *k*, pivoted at one end to the rod *a*, is at the other end loosely fulcrumed upon a shaft, *i*, which is journaled in bearings F F. A pinion, *m*, and ratchet-wheel *n*, are secured to the shaft *i* near its respective ends.

The spring feeding-pawl *o′*, attached to the bar *k*, engages with the teeth of the ratchet-wheel *n*, so as to impart a slight rotation to said ratchet-wheel at each motion of the bar *k*, when actuated by rod *a*. The arm to which the feeding-pawl is attached is centered at a point within the radius of the ratchet-wheel, and has a radial motion around said center, so that a larger number of small teeth may be made in the ratchet, and the machine be more compact. The retaining spring-pawl *o* also engages with the teeth of the ratchet-wheel *n*, and prevents retrograde motion of said wheel *n*. The reaction-spring *w*, attached to the bar *k*, rod *a*, and apron *c*, to position after deposit, registration, and indication, have been effected. The pinion *m* gears with a cogged rim, *f*, upon a large drum, *g*, which is secured to a shaft journaled in the main frame or casing.

By means of suitable gearing P, the motion of shaft *g* is communicated to a shaft, *l*, which carries an index, *l′*. In the present illustration the gearing P is so proportioned as to impart but one revolution to the index *l* by every four revolutions of the drum *g*, and the drum *g* has a series of continuous numbers, which envelope the drum in four lines, so that the position of the index *l* indicates the line on drum to be read from.

It will be observed that great compactness is achieved by placing the registering-train between the point of actuation and the point at which the feeding-pawl engages with the ratchet of the registering-train.

A key-shaft, *q'*, communicates through gearing *q r e f* with the drum *g*, for the purpose of rotating it without the agency of the hand-rod *a*, and without sounding the alarm, setting it to any desired number as a starter. A stationary pointer, *u*, assists in reading the figures on drum *g*.

The hammer X is shaped and pivoted like a bell-crank lever, and provided with a spring-pawl, *y*, which engages with the actuating-rod *a* in one direction, but passes it freely in the other. A reaction-spring, *t*, upon the release of the hammer from rod *a*, throws it against the bell *v*. This release, it will be observed, cannot take place until the register has been actuated. A key, *b*, passes through the rod *a*, when desired, and, secured by the lock *z*, effectually prevents the movement of the mechanism by improper and unauthorized parties.

It will also be observed that the receiver is a primary and not a secondary receiver. The ticket or check is examined, and errors, if any, corrected while the passenger retains control of his property, and the deposit only takes place at the conclusion of the settlement, and is single and not double, as in case of fare-boxes.

Before placing the machine in the hands of the conductor or fare-taker, the superintendent or other person in charge, by means of key-shaft *q'*, sets the drum *g* at any desired position, noting the indications of the pointer *u* and the index *l* of the registering-train, and closes the case, leaving only the actuating-rod *a* exposed.

The conductor or fare-taker carries the machine with him through the car, and as each check or ticket is placed upon the apron he actuates rod *a*, and thereby opens the mouth of the receiver and deposits the check or ticket, rotates the ratchet-wheel *n* one tooth, and the drum *g* the space of one number, and last of all releases the hammer, which strikes an alarm, and thus indicates that a registration has been effected.

In Fig. 1 the rod *a* and bar *k*, &c., are represented on the opposite side of the drum from that which they occupy in the other views. This and other slight modifications may be made in the apparatus without departing from the essential principles of the invention.

I claim and desire to secure by Letters Patent—

1. In a portable fare-register, the combination of an inclosed registering or counting train, an inclosed indicator or alarm, and a primary receiver, whereby, at one and the same impulse, on the receipt of each fare a deposit is made directly in the receiver, a numerical registration made, and an alarm sounded, substantially as set forth, and for the purpose described.

2. In a portable fare-register, the combination of a receiver provided with an orifice opened for and during the receipt of each fare, and closed at other times, with a registering-train simultaneously operated by the same actuating handle or rod, substantially as and for the purpose described.

3. In a portable fare-receiver, the combination of a receiver provided with an orifice opened for and during the receipt of each fare, and closed at other times, with an alarm simultaneously operated by the same actuating handle or rod, substantially as and for the purpose described.

4. In combination with portable and inclosed registering and alarm mechanisms, actuated by a single handle, a receiver separated therefrom by a diaphragm or partition, in which tickets or tally-pieces are deposited, and registration and alarm effected by one operation of said handle, substantially as described.

5. In a portable fare-register, the combination of an actuating-arm, pivoted on the axis of the ratchet of the recording or counting mechanism, a spring feeding-pawl attached to said arm, and receiving therefrom its actuating motion, and a reaction-spring restoring said arm to position, substantially as described.

6. In a fare-register having an alarm mechanism, the combination of an actuating arm or lever pivoted to a center within the radius of the ratchet-wheel of the register, a spring feeding-pawl attached to said arm or lever, and receiving therefrom its actuating motion, and a retaining-pawl to prevent retrograde motion of said ratchet-wheel, substantially as described.

7. In a fare-register having alarm mechanism, the combination, with the registering-train, of mechanism whereby the register may be set to any required position without operating the proper actuating mechanism, substantially as described.

EDWIN R. BROWN.

Witnesses:

H. A. CHASE,

ANDREW RICKER.